(12) United States Patent
Xue et al.

(10) Patent No.: US 8,363,770 B1
(45) Date of Patent: Jan. 29, 2013

(54) OVERSAMPLING WITH PROGRAMMABLE POINTER ADJUSTMENT

(75) Inventors: Ning Xue, Fremont, CA (US); Chong H. Lee, San Ramon, CA (US)

(73) Assignee: Altera Corporation, San Jose, CA (US)

( * ) Notice: Subject to any disclaimer, the term of this patent is extended or adjusted under 35 U.S.C. 154(b) by 873 days.

(21) Appl. No.: 11/555,570

(22) Filed: Nov. 1, 2006

(51) Int. Cl.
*H04L 12/50* (2006.01)

(52) U.S. Cl. ........ 375/360; 375/316; 375/355; 375/368; 375/370

(58) Field of Classification Search ................... 375/355, 375/360, 368, 370
See application file for complete search history.

(56) References Cited

U.S. PATENT DOCUMENTS

| | | | | |
|---|---|---|---|---|
| 6,944,577 B1 * | 9/2005 | Mauer et al. | ................... | 702/189 |
| 7,038,488 B1 | 5/2006 | Tyson | | |
| 7,167,534 B2 * | 1/2007 | Nakamura | ..................... | 375/373 |
| 7,190,738 B2 * | 3/2007 | Neugebauer et al. | ......... | 375/316 |
| 7,532,645 B1 * | 5/2009 | Bataineh et al. | .............. | 370/503 |

OTHER PUBLICATIONS

XLINX; Dynamic Phase Alignment Using Asynchronous Data Capture; Yeoh et al.; Jan. 2005; pp. 1-13.*
XILINX; Dynamic Phase Alignment Using Asynchronous Data Capture; Yeoh et al.; Jan. 2005; pp. 1-13.*
XLINX; Dynamic Phase Alignment Using Asynchronous Data Capture; Yeoh et al; Jan. 2005; pp. 1-13.*
Altera, "Serial Digital Interface Reference Design for Cyclone & Stratix Devices", *Altera Corporation*, Aug. 2004, AN-356, Version 1.1, 14 pages.
XILINX, "RocketIO Oversampling Logic Block Characterization: Test Report", www.xilinx.com, Oct. 21, 2004, RPT008, Version 1.0, 10 pages.
Chuang, "A 3/4/5/6X Oversampling Circuit for 200 Mb/s to 100 Mb/s Serial Interfaces" www.xilinx.com, Nov. 18, 2004, XAPP572, Version 1.0, 13 pages.

* cited by examiner

*Primary Examiner* — David Ometz
*Assistant Examiner* — Eboni Hughes
(74) *Attorney, Agent, or Firm* — Ropes & Gray LLP (57) ABSTRACT

Systems, methods, and circuits extract data from an oversampled data stream in the presence of noise and/or jitter. Pointers decide which data samples of the oversampled data stream are extracted. Some of the pointers occurring right after a data transition are positioned based on the location of previous pointers, rather than using the data transition points as occurs during an alignment. Settings such as the frequency of how often a pointer is aligned with a data transition and a maximum adjustment amount during an alignment may be programmable.

27 Claims, 7 Drawing Sheets

OVERSAMPLING WITH PROGRAMMABLE POINTER ADJUSTMENT

BACKGROUND

The present invention relates generally to data transmission and more particularly to extracting data from an oversampled data stream.

It is often necessary for a circuit, such as a programmable logic device (PLD), to transfer data to another circuit. During transmission the data stream may be oversampled because, for example, the circuits and/or interfaces may operate at different frequencies or simply to provide for an accurate transmission. Difficulties in the transmission are exacerbated by these many different applications in which a PLD may be used. For example, a data stream received by a particular type of PLD may come from or through a variety of sources, each related to a different application.

A difficulty is the extraction, and thus reproduction, of the data transmitted from the oversampled data stream. One problem in the extraction is that the phase and duty cycle of the oversampled data stream may not be known. Thus, the oversampled data stream requires analysis to determine a proper continuing alignment for the extraction. The alignment can be difficult in the real world as a data stream is an analog representation of discrete values, and the analog signal may exhibit noise or jitter. Even though some current techniques correct for some misalignment errors, noise or jitter errors persist and may be introduced into the extracted data, particularly with very noisy and jittery signals.

Furthermore, as serial protocols become more popular, more circuit designs need to offer solutions supporting various generations of speed. That demand has fueled the usage of dynamic switching among channels and/or different oversampling ratios, each of which may have differing amounts of noise and jitter depending on the application. The environment of each application may also involve, for example, different voltage supply offsets and temperature variations that could cause noise and jitter in the oversampling data stream, which can cause errors in the extraction of data.

Therefore, it is desirable to have methods and systems for extracting data that can tolerate the higher jitter and noise arising from varied applications and environments.

BRIEF SUMMARY

Accordingly, embodiments of the present invention are directed to systems, circuits, and methods for extracting data from an oversampled data stream in the presence of noise and/or jitter. Pointers decide which data samples of the oversampled data stream are extracted. Embodiments utilize the more stable previous data extraction points for positioning some of the pointers occurring after a data transition, rather than only using the data transition points themselves. Herein, locating the pointer at the appropriate data sample based on the location of a detected data transition is termed "aligning," whereas the term "positioning" is broader and may include locating based on previous pointer positions.

According to one exemplary embodiment, an oversampled data stream contains sets of data samples, and pointers determine which data samples are extracted. A first pointer is aligned by detecting a first data transition and by determining the first pointer position based on the first data transition. A first data sample is extracted based on the first pointer position. Subsequent to detecting a second data transition, a second pointer is positioned based on the first pointer position. A second data sample, which may be from a second sample set, is extracted based on the second pointer position.

In one embodiment, after detecting the second data transition, an additional pointer position is aligned to a subsequently detected data transition. In one aspect, the alignment of the additional pointer is in response to a jitter event. The additional pointer position may be adjusted from an estimated location, where the adjustment amount may be limited by a maximum value, In another embodiment, N data transitions are detected in between detecting the second data transition and the subsequent data transition. The pointers corresponding to the N data transitions are positioned based on previous pointer positions, where N may be zero. N and the maximum adjustment may be programmed by a user or by a setting circuit. These and other adjustment settings may be changed in response to a change in the oversampling rate or a change in a data rate. In one aspect, N and the maximum adjustment amount are changed such that both increase or both decrease.

In one embodiment, N and the maximum adjustment amount are determined based on a measurement of jitter and noise. In one aspect, the measurement may be of the current level of jitter and noise, and the optimal adjustment settings for the current level may be read from a table. In another aspect, measurements of jitter tolerance may be done at many adjustment settings, and the settings that provide optimal jitter tolerance are selected.

According to another exemplary embodiment, an integrated circuit that may perform any of the functions herein is provided. The integrated circuit typically includes a receiver that receives the oversampled data stream, a transition detector that detects data transitions, an aligner that aligns a first pointer position based on a first data transition, a positioner that determine a second pointer position based on the first pointer position, and an extractor that extracts a data sample based on each pointer position. In one embodiment, the aligner aligns a subsequent pointer based on a subsequently detected data transition. In one aspect, the positioner and the aligner are programmable or may be hard-wired to only align pointers after a certain period of time, after a certain number of data transitions have been detected, and/or after a certain event is detected.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

DETAILED DESCRIPTION OF EXEMPLARY EMBODIMENTS

Embodiments of the present invention are directed to extracting data from a data stream in the presence of noise and/or jitter. Embodiments utilize the more stable previous data extraction points for positioning some of the pointers that are used to extract the data, rather than only using data transition points. Although embodiments are directed to PLDs, one skilled in the art will appreciate that other types of circuits such as application specific integrated circuits (ASIC) may incorporate aspects of the present invention.

Figure 1:
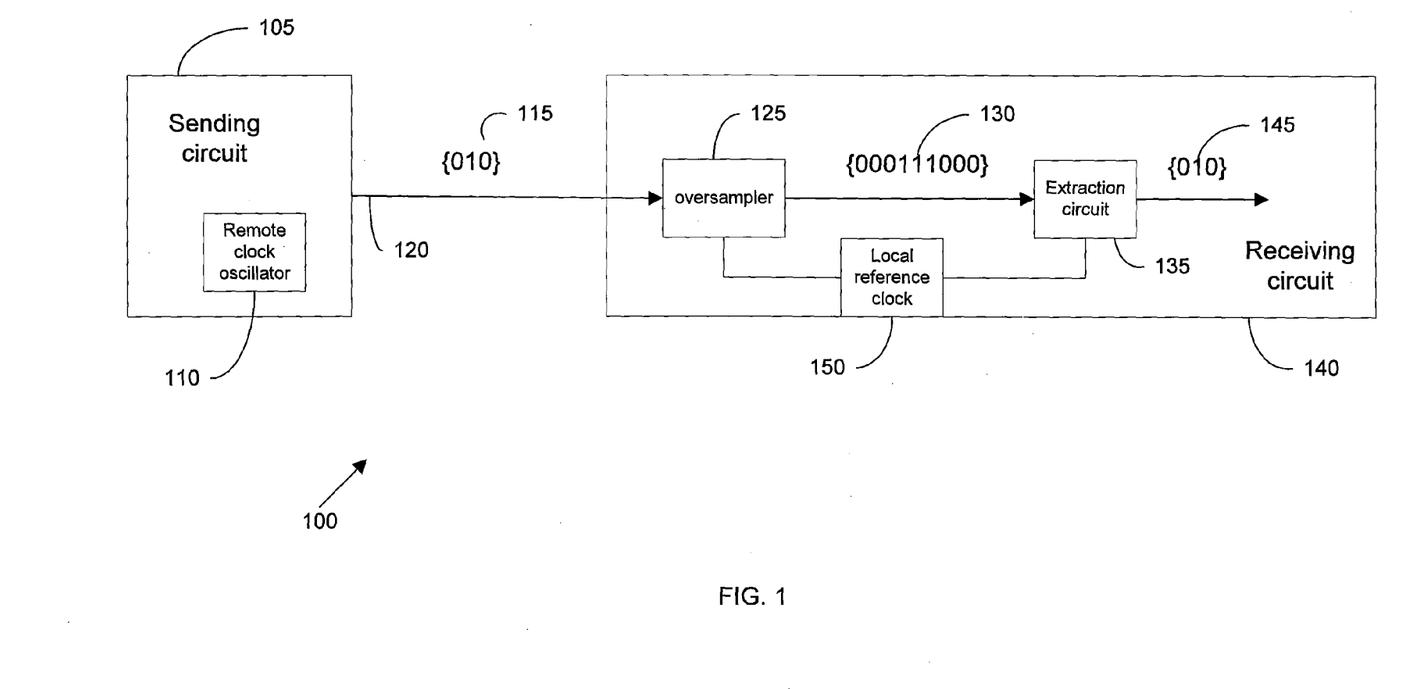
FIG. 1 illustrates a system for the transmission of data according to an embodiment of the present invention.

FIG. 1 illustrates a system 100 according to an embodiment of the present invention. Sending circuit 105 sends a data stream 115 at a sending rate, e.g. 100 Mhz, determined by a remote clock oscillator 110. Data stream 115 is sent via data bus 120 to receiving circuit 140 as an analog data signal representing the digital values. Oversampler 125 samples the data signal at an oversampling rate, e.g. 300 Mhz, which is higher than the sending rate, to give an oversampled data stream 130. The oversampling rate of oversampler 125 is determined by local reference clock 150.

To convert the oversampled data stream into data usable by the receiving circuit 140, specific data bits are extracted by extraction circuit 135. For example, one out of every three bits may be extracted from data stream 130 to create extracted data 145, which is an accurate reproduction of data stream 115. Extraction circuit 135 may also use local reference clock 150.

Sending circuit 105 may operate at a different data rate than databus 120 or receiving circuit 140. Thus, oversampling may be done in sending circuit 105 in addition to, or instead of, the oversampling done in receiving circuit 140. For example, a data stream may be oversampled 10× in sending circuit 105 for sending via data bus 120 and then downsampled by a factor of 2 in receiving circuit 140 by extracting approximately one out of every five bits.

Figure 2:
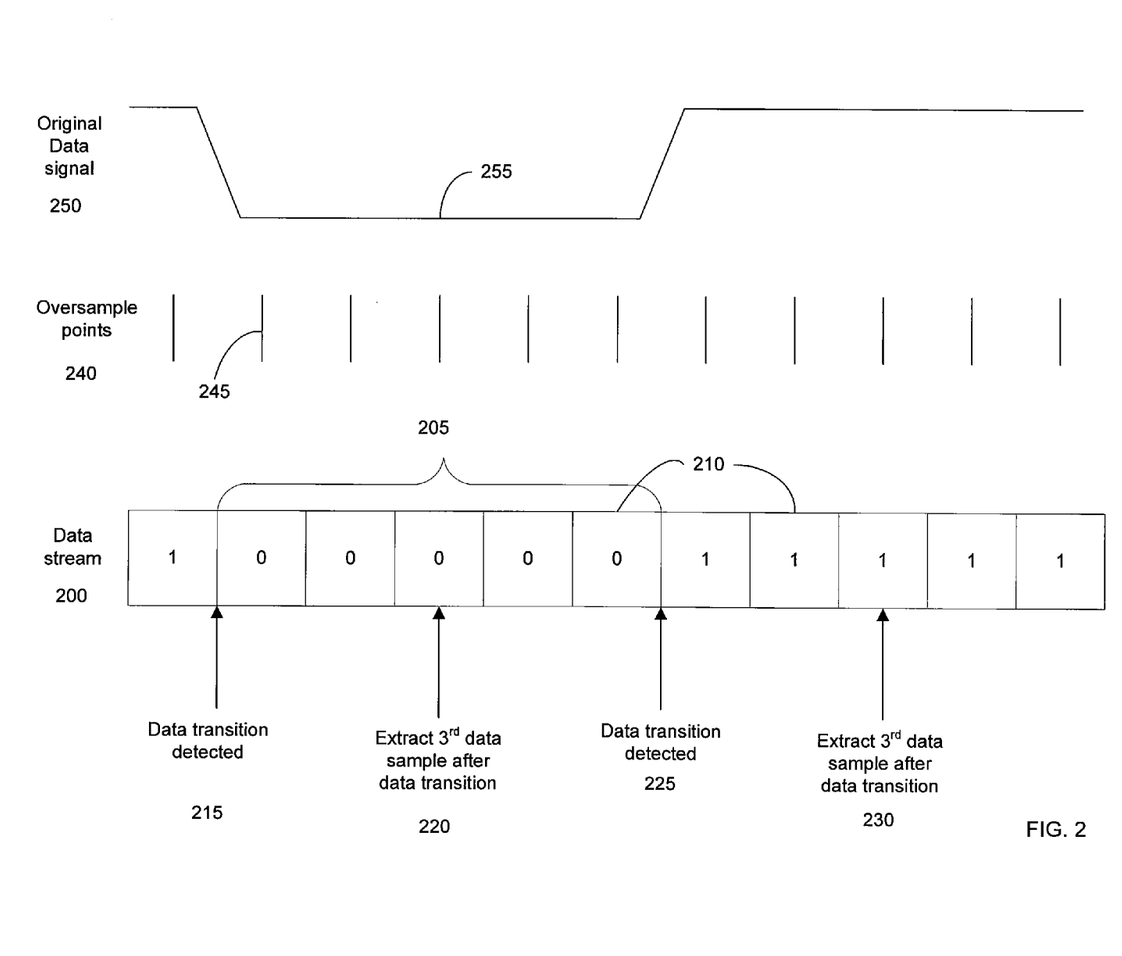
FIG. 2 illustrates the extraction of data from a data signal using oversampling, where both do not exhibit noise or jitter.

FIG. 2 illustrates a mechanism for extracting data from a five times oversampled data stream 200 not exhibiting jitter or noise. Oversampled data stream 200 is created from an original data signal 250, such as data stream 115 from FIG. 1. Data signal 250 is an analog signal representing digital data at one data rate, e.g. 100 Mhz. Ideally, during one received bit 255, data signal 250 is sampled a fixed amount of times, which corresponds to the oversampling rate. In FIG. 2, the oversampling rate is five.

Data samples 210 of oversampled data stream 200 each correspond to an oversampling point 240. Thus, the value for each data sample, i.e. a "0" or a "1", is obtained from the value of data signal 250 at the corresponding oversample point 245. The resulting oversampled data stream 200 contains sets 205 of data samples 210. Each set 205 corresponds to a single data bit, e.g, bit 255, of data signal 250. Specific data samples are extracted from oversampled data stream 200 to accurately reproduce the digital data that was sent as the analog data signal 250. For example, ⅕th of the data samples may be extracted.

A pointer is used to indicate which bits in oversampled bit stream 200 are to be extracted. The pointer needs to be aligned such that best extraction location is used. To align the pointer, the data stream is analyzed to identify a data transition location 215. A data transition is signified by a change from "0" to "1" or vice versa. This may be accomplished by many ways as is known to one skilled in the art.

After a data transition 215 has been located, the location of a pointer 220 for the next data sample to be extracted may be calculated based on the type of oversampling used and the location of the data transition. For example, in 5× oversampling, the third data sample after the data transition is the best location because the third data sample results from a sampling of the center of bit 255 of the original data signal 250. Locating a pointer at the appropriate bit after a detected data transition is termed "aligning" or "realigning" herein.

Typically realignment continues for each data transition. For example, when data transition 225 is detected, a pointer position 230 is located again at the third data sample from the data transition. This realignment can correct for errors due to a constant frequency mismatch resulting from remote clock oscillator 110 and local reference clock 150 have slightly different frequencies. The realignment corrects the misalignment that results from the constant frequency mismatch.

In addition to constant frequency mismatches, errors also result from the fact that all clock rates are not constant, but vary over time. This frequency variation over time is called jitter. In the instance of two circuits communicating, there are two sources of jitter: one from the input data, and the other from the local reference clock.

The variance of the clock rate of remote clock oscillator 110 creates jitter in input data 115. For example, any noise, voltage supply offset, or temperature variation could make remote clock oscillator 110 run slightly faster or slower within a short period. Therefore the transmitted data 115 carries jitter. When the data 115 is sent between circuits, data 115 is also subject to any noise and interference introduced by system 100, e.g. from other bus lines not shown. In the receiving circuit 140, any temperature, voltage supply, system/link degradation or clock data recovery (CDR) mismatch would introduce inaccuracies into the data being received. All of these combined forms appear as the input data jitter.

Figure 3:
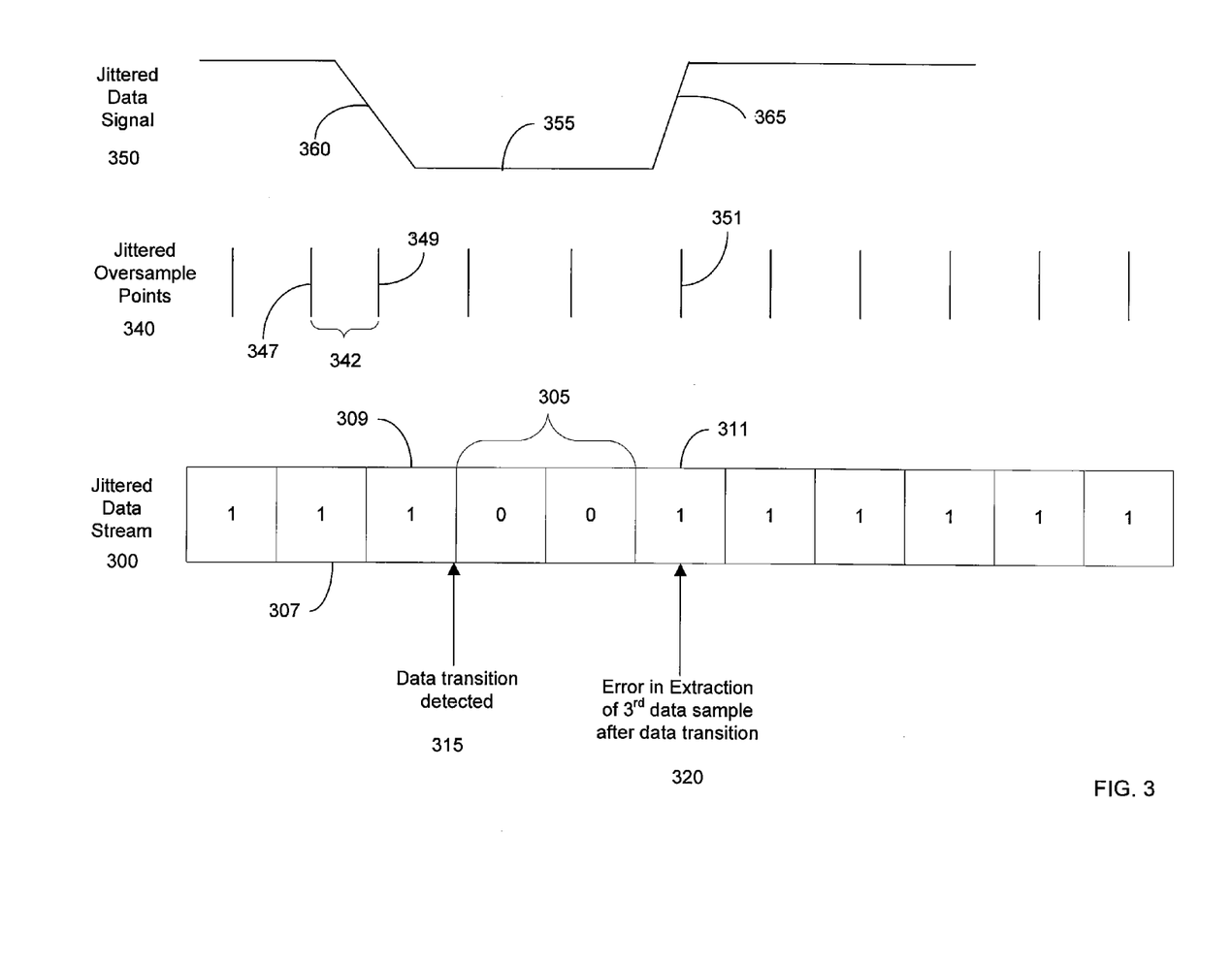
FIG. 3 illustrates errors occurring in the extraction of data in the presence of jitter.

FIG. 3 illustrates a diagram for the extraction of data from a data signal 350 exhibiting jitter. A consequence of the input data jitter is that the shape of the jittered data signal 350 can change relative to the original data signal 260, creating a received bit 355 that has a smaller period. This smaller period may result from a relatively later start of signal transition 360, and a longer slope for the signal transition to go from "1" to "0". The smaller period may cause errors in data extraction as outlined below.

The oversampling points 340 may also exhibit jitter as shown for example, by a decrease in the period 342. Reference clock 150 is also subject to similar factors that can cause jitter, such as temperature and voltage supply differences in the receiving circuit 140 from the sending circuit 105. This may cause phase migration or wander as reference clock 150 becomes less stable. This temporary speed difference between the input data and the local reference clock may compound bit extraction errors when reference clock 150 drives local CDR and bit extraction circuit 135.

Both types of jitter can affect oversampled bit stream 300, which can cause errors in data extraction. For example, a data signal bit could be sampled less or more than the prescribed number of time for a particular oversampling rate, which can result in the best extraction location no longer being the third data sample of a set. For 5× oversampling, this could result in some sets having four or six sample bits. In circumstances of very high frequency or amplitude of jitter, a set can have even less or more. Jittered data stream 300 shows such an example with only two data samples for set 305.

In oversampled bit stream 300, second data sample 307 becomes "1" as the oversample point 347 occurs sooner and the signal transition 360 occurs later. Third data sample 309 becomes "1" as the oversample point 347 occurs sooner and the signal transition 360 has not completed the transition, and thus a "1" may be interpreted since the voltage signal is still relatively high. Accordingly, the data transition 315 is not detected until a later point. When the pointer location 320 is taken as the third data sample after the data transition 315, the extracted bit 311 is erroneous. This may occur because transition signal 365 occurs earlier and/or oversampling point 351 occurs later. This movement of signal transitions and oversampling points in different directions can result from high frequency jitters.

Compounding the problem of jitter is the existence of noise, which may corrupt data samples of a set. Data samples may be corrupted for similar reasons as the causes of jitter. All of these factors may cause a data sample to be interpreted as 0 when it is actually a 1, and vice versa. As a result, all data samples of a set are not always correct. Frequently, the very first and very last bit could carry wrong values, and at times the second and fourth bit can also be corrupted.

These incorrect values may cause the locations of data transitions to be incorrectly determined, which can cause errors when the pointer is re-aligned based on the location of the incorrect data transition. For example, these incorrect values may cause a data transition to be detected earlier or later creating a similar effect as jitter. Even if signal transition 360 did not occur earlier than normal, a noisy upturn in the signal voltage could still cause data sample 309 to be interpreted as a "1" and not the desired "0". Similarly, an error related to data sample 311 can also be caused by noise.

Accordingly, data extraction strictly based on the location of a data transition can create difficulties when there is jitter. The susceptibility of the location of a data transition to be altered by the existence of jitter and/or noise can cause a data transition to be a poor choice for realigning the pointer. In contrast, the center of a previous data signal bit is more stable. For example, the analog data signal has typically settled into a certain voltage by the middle of a bit. However, at certain times realignment, i.e. use of a data transition, should occur.

Figure 4:
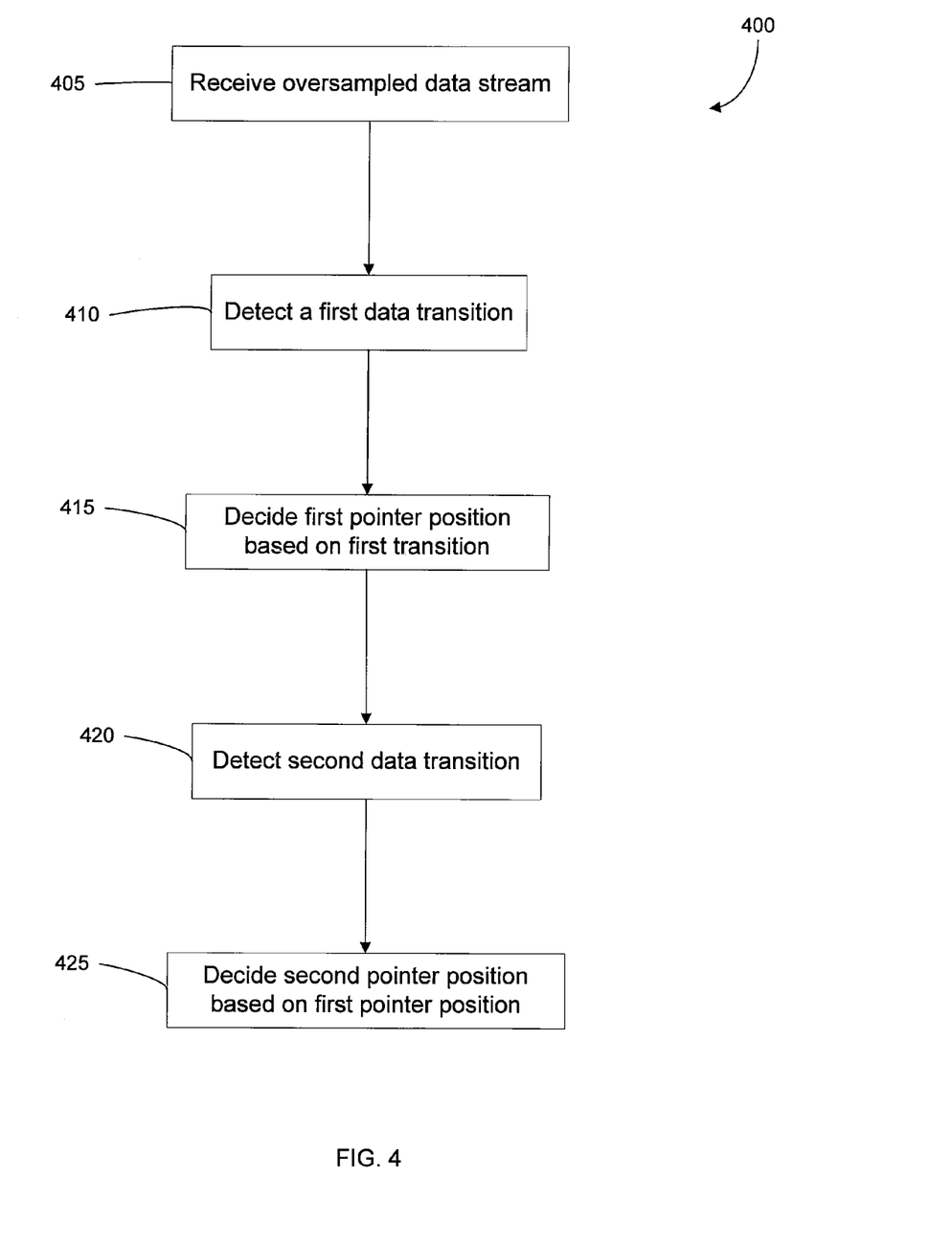
FIG. 4 illustrates a method for extracting data according to an embodiment of the present invention.

FIG. 4 shows a method 400 of extracting data according to an embodiment of the present invention. In step 405, an oversampled data stream is received. In step 410, a first location of a first data transition in the oversampled data stream is detected. In step 415, based on the first location, a first pointer position based on the first location is determined, which may be part of alignment procedure. The pointer determines which data samples are extracted. The number bit to be extracted after a data transition may be stored in memory or hard-wired into a circuit.

In step 420, a second data transition is detected. In step 425, a second pointer position is determined based on the first pointer position. The second pointer determines which data sample from a second set is extracted. Subsequent pointers may also be determined based on the positions of a previous pointer. The number of bits after the positions of one pointer may be stored in memory or hard-wired into a circuit.

Subsequent re-alignments with a data transition edge should be performed, e.g. to respond to low frequency jitter including a constant frequency mismatch. In one aspect, a subsequent alignment may occur after a particular jitter event, such as a detection of a significant amount of jitter or a misalignment indicator. The jitter event may result from the analysis of the input analog data signal. A jitter event may also include when the oversampling ratio varies or when the incoming data rate changes (a dynamic channel switch). In another aspect, subsequent alignment may occur after a prescribed amount of time or data transitions. As realignment is not done at every detected data transition, computational resources may be saved.

Figure 5:
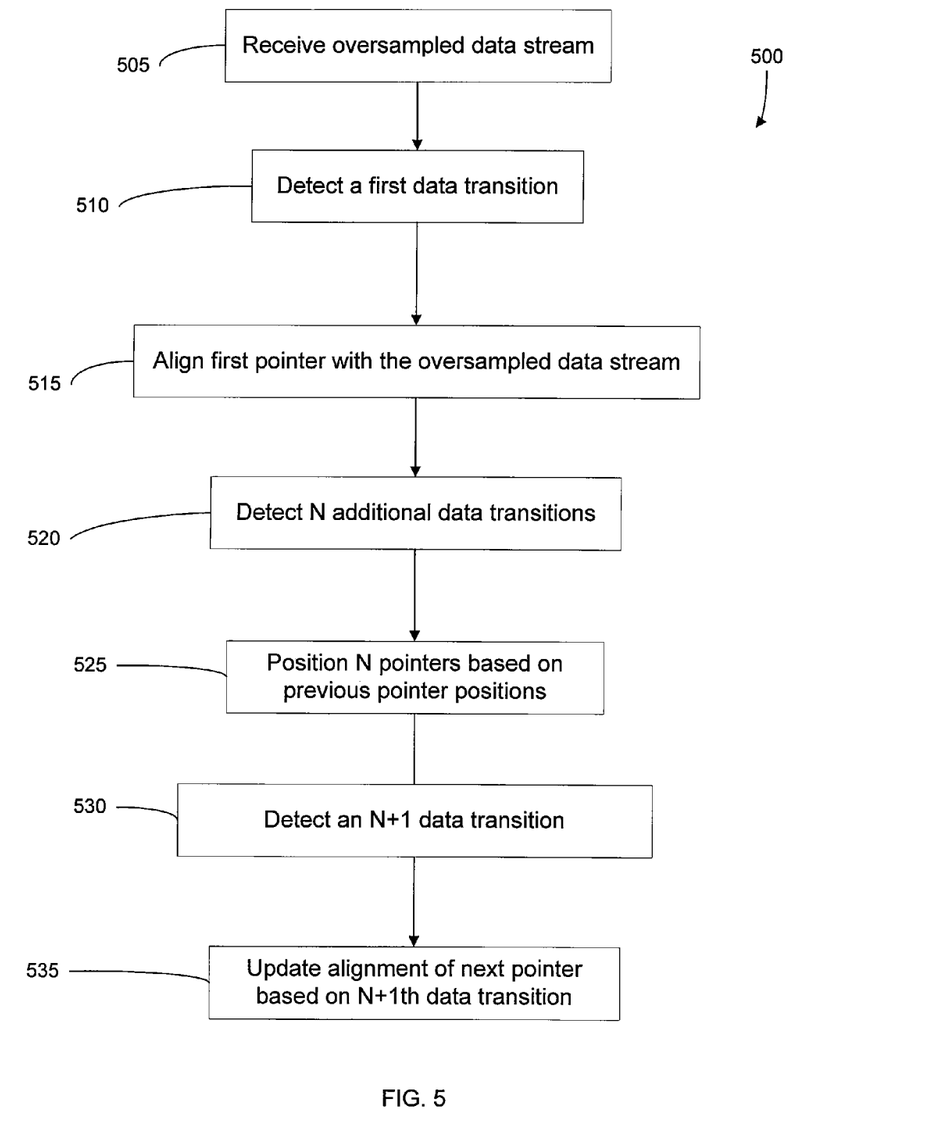
FIG. 5 illustrates a method for extracting data with a specific alignment frequency according to an embodiment of the present invention.

FIG. 5 shows a method 500 of extracting data according to an embodiment of the present invention. In step 505, an oversampled data stream is received. In step 510, a first location of a first data transition in the oversampled data stream is detected. In step 515, based on the first location, a first pointer position based on the first location is determined, which may be part of alignment procedure.

In step 520, N additional data transitions are detected. In one aspect, N is a programmable value that determines the frequency of an alignment and is an integer that may be equal to or greater than zero. In step 525, at least N additional pointers are positioned based on previous pointer positions. There may be more than N additional pointers as several consecutive data signal bits may have the same value. In one aspect, each additional pointer is positioned based on the pointer immediately before that pointer. In another aspect, the first additional pointer is used to position all of the other additional pointers. In step 530, a location of an N+1 data transition is detected. In step 535, based on the location of the N+1th data transition, the alignment of the pointer is adjusted.

How often the pointer alignment should be adjusted, e.g. the value of N, depends upon the incoming data conditions. If N is an appropriate value, better jitter tolerance will be obtained. In general, if the pointer alignment were updated too frequently, the extraction would track high frequency jitters. Thus, frequent updating would introduce noise into the recovered data and impact the downstream processing. If pointer alignment were updated too seldom, the extraction would not respond to low frequency jitter and could sample corrupted values. Seldom updating could thus cause the bit error rate in the extracted stream to be higher. In one embodiment, the frequency of which the pointer is updated is programmable.

How much and whether a pointer should be adjusted during each alignment can also be important for obtaining better jitter tolerance. The adjustment amount is the amount that the pointer is adjusted from an estimated location. In one embodiment, the estimated location is where the pointer would be based on a previous pointer location. When the estimated location is still accurate, no adjustment may be done. In one aspect, the adjustment amount is limited by a maximum value.

The adjustment amount typically varies along oversampling ratios. In 3× oversampling with a maximum adjustment amount of 1, the pointer is adjusted during each alignment in steps of up to one data sample before or after the estimated location. Over a relatively long time, many +/−1 steps can be made. In 5× oversampling, the maximum adjustment amount should typically be 2. Thus, a pointer can be moved in +/−1 or +/−2 steps for each alignment. Similarly, in 7× oversampling, the maximum adjustment amount should typically be 3. The maximum amount that the pointer position is changed may also be programmable.

In one aspect, the maximum step size depends upon clock jitter/rate difference, and how frequently the pointer is realigned. If pointer adjustment is done frequently, a lesser amount of adjustment should be used because there is another chance to correct shortly thereafter. If pointer adjustment is done seldom, more amount of adjustment should be used because the pointer location isn't to be updated in a while.

In a specific application, a user may have the best knowledge of the jitter and may input the programmable pointer adjustment settings accordingly, e.g. the best combination of adjustment frequency and maximum adjustment amount. In other situations, a user may not have knowledge about the jitter and noise properties of the system. Accordingly, in one embodiment, the settings may be determined by the system, e.g. by a jitter setting circuit.

Based on an amount or characteristic of the actual jitter and/or noise detected, an appropriate setting may be implemented. For example, measurements of performance, such as jitter tolerance, at a plurality of pointer adjustment settings can be received or produced. The optimal settings may then be chosen based on the measurements.

Measurements may also be done at different noise and/or jitter levels. In one aspect, the optimal setting corresponding to each different noise and/jitter level may be stored and accessed at a later time, e.g. when a measured jitter and/or noise changes. In this manner, an optimal setting for the current noise and/jitter levels may be retrieved from memory, e.g. a table, so that new measurements are not required. Any of the measurements described above may be done in a calibration step of the system done once at startup, periodically when the system allows, or during development of a circuit or system. In one aspect, new adjustment settings are determined when a jitter event or situation is detected or when there is a change in the oversampling rate or dynamic channel switch.

Figure 6:
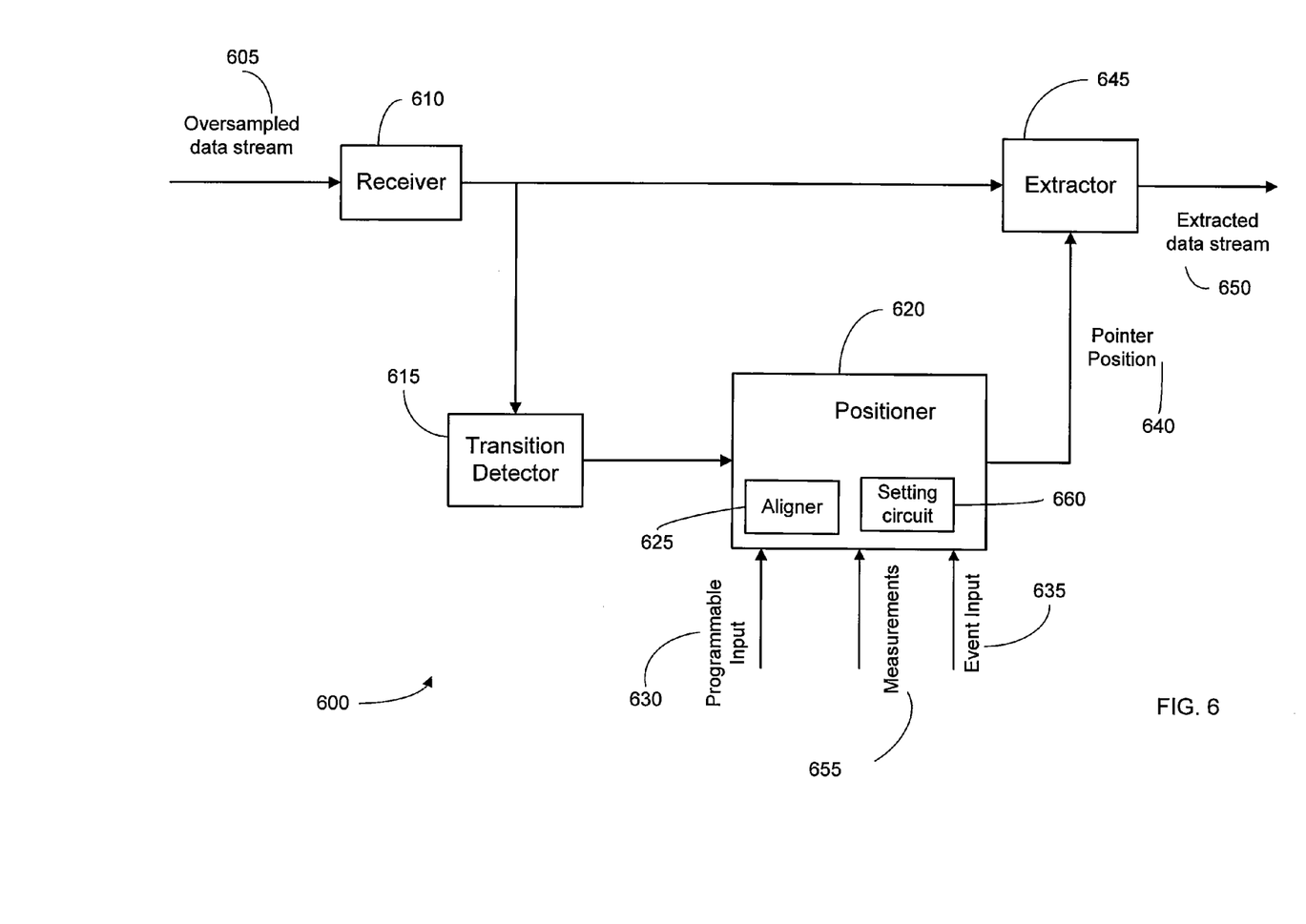
FIG. 6 illustrates a an extraction circuit according to an embodiment of the present invention.

FIG. 6 shows a circuit 600 according to an embodiment of the present invention. Circuit 600 may be used as extraction circuit 135. A receiver 610 receives the oversampled data stream 605. A transition detector 615 detects data transitions in the oversampled data stream 605. The locations of the data transitions are sent to a positioner 620, which positions a pointer for extracting data samples from oversampled data stream 605. The pointer position 640 is sent to a data extractor 645, which also receives the oversampled data stream 605. Based on the pointer position, extractor 645 selects certain data samples from the ovesampled data stream to produce extracted data stream 650.

In one aspect, positioner 620 includes an aligner 625, which determines the position of a pointer by aligning the pointer relative to certain detected data transitions. In another aspect, positioner 620 positions other pointers based on a location of a previous pointer, and not on a detected data transition. As depicted aligner 625 is included within positioner 620; however, in other embodiments, aligner 625 may be separate from positioner 620 or aligner 625 may utilize all or part of the same circuitry as positioner 620.

Positioner 620 may receive input as to when aligner 625 should be used to adjust the pointer based on an alignment to a data transition and when to position the pointer based on a location of previous pointer. In one aspect, a programmable input 630 may be used to input different adjustment settings as previously described. For example, programmable input 630 may prescribe that every Nth data transition be used to align a pointer, and that other pointers are positioned based on previous pointers. The programmable input may be supplied by a user or by an analysis module that detects the actual jitter and selects and implements beneficial settings.

In one embodiment, positioner 620 includes a setting circuit 660, which uses performance measurements 655 to determine the adjustment settings. Setting circuit 660 may include a memory element of any suitable type for storing adjustment settings, e.g. as a table with measured noise and/jitter levels and a corresponding optimal adjustment setting for each level. As depicted setting circuit 660 is included within positioner 620; however, in other embodiments, setting circuit 660 may be separate from positioner 620 or setting circuit 660 may utilize all or part of the same circuitry as positioner 620.

In another aspect, an event input 635 may be used as an indicator that an alignment of a pointer to the next data transition is to be done. Even input 635 may be used in conjunction with the programmable input, e.g. as an override to the programmable input, or used independently as the sole control over when realignment occurs.

Figure 7:
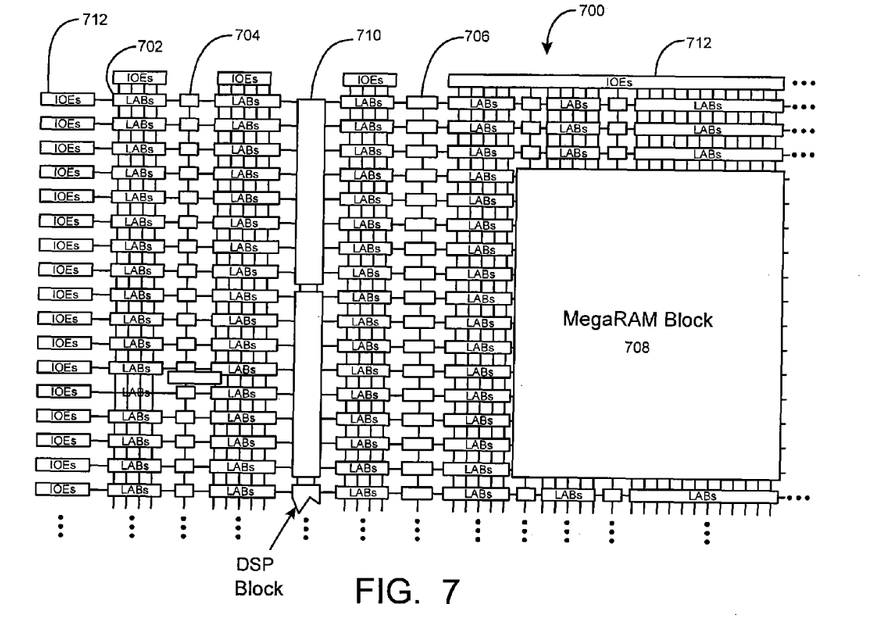
FIG. 7 illustrates a simplified block diagram of a programmable logic device that does benefit by incorporating embodiments of the present invention.

FIG. 7 is a simplified partial block diagram of an exemplary high-density programmable logic device 700 wherein techniques according to the present invention can be utilized. PLD 700 includes a two-dimensional array of programmable logic array blocks (or LABs) 702 that are interconnected by a network of column and row interconnections of varying length and speed. LABs 702 include multiple (e.g., 10) logic elements (or LEs), an LE being a small unit of logic that provides for efficient implementation of user defined logic functions.

PLD 700 also includes a distributed memory structure including RAM blocks of varying sizes provided throughout the array. The RAM blocks include, for example, 512 bit blocks 704, 4K blocks 706 and an M-Block 708 providing 512K bits of RAM. These memory blocks may also include shift registers and FIFO buffers. PLD 700 further includes digital signal processing (DSP) blocks 710 that can implement, for example, multipliers with add or subtract features.

It is to be understood that PLD 700 is described herein for illustrative purposes only and that the present invention can be implemented in many different types of PLDs, FPGAs, and the other types of digital integrated circuits.

Figure 8:
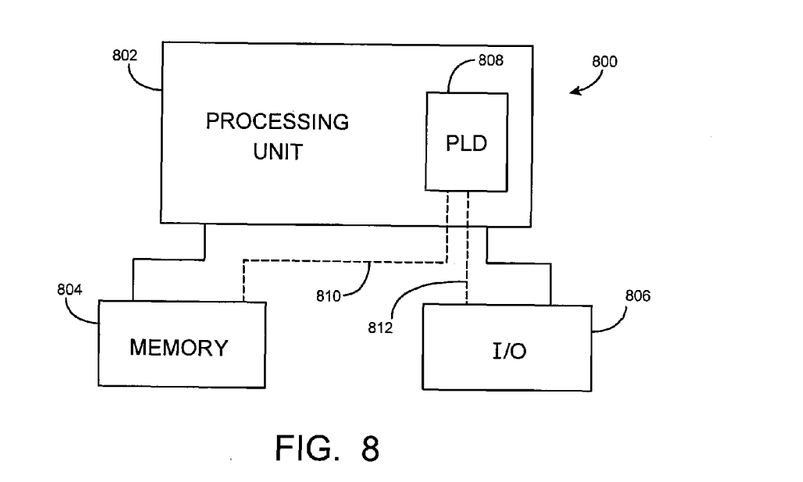
FIG. 8 illustrates a block diagram of an electronic system that does benefit by incorporating embodiments of the present invention.

While PLDs of the type shown in FIG. 7 provide many of the resources required to implement system level solutions, the present invention can also benefit systems wherein a PLD is one of several components. FIG. 8 shows a block diagram of an exemplary digital system 800, within which the present invention may be embodied. System 800 can be a programmed digital computer system, digital signal processing system, specialized digital switching network, or other processing system. Moreover, such systems may be designed for a wide variety of applications such as telecommunications systems, automotive systems, control systems, consumer electronics, personal computers, electronic displays, Internet communications and networking, and others. Further, system 800 may be provided on a single board, on multiple boards, or within multiple enclosures.

System 800 includes a processing unit 802, a memory unit 804 and an I/O unit 806 interconnected together by one or more buses. According to this exemplary embodiment, a programmable logic device (PLD) 808 is embedded in processing unit 802. PLD 808 may serve many different purposes within the system in FIG. 8. PLD 808 can, for example, be a logical building block of processing unit 802, supporting its internal and external operations. PLD 808 is programmed to implement the logical functions necessary to carry on its particular role in system operation. PLD 808 may be specially coupled to memory 804 through connection 810 and to I/O unit 806 through connection 812.

Processing unit 802 may direct data to an appropriate system component for processing or storage, execute a program stored in memory 804 or receive and transmit data via I/O unit 806, or other similar function. Processing unit 802 can be a central processing unit (CPU), microprocessor, floating point coprocessor, graphics coprocessor, hardware controller, microcontroller, programmable logic device programmed for use as a controller, network controller, and the like. Furthermore, in many embodiments, there is often no need for a CPU.

For example, instead of a CPU, one or more PLD 808 can control the logical operations of the system. In an embodiment, PLD 808 acts as a reconfigurable processor, which can be reprogrammed as needed to handle a particular computing task. Alternately, programmable logic device 808 may itself include an embedded microprocessor. Memory unit 804 may be a random access memory (RAM), read only memory (ROM), fixed or flexible disk media, PC Card flash disk memory, tape, or any other storage means, or any combination of these storage means.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method for extracting data from an oversampled data stream, comprising:
    receiving an oversampled data stream containing sets of data samples, wherein pointers determine which data samples are extracted;
    detecting a first location of a first data transition in the oversampled data stream;
    determining a first pointer position based on the first location;
    extracting a first data sample based on the first pointer position;
    detecting a second data transition;
    subsequent to detecting the second data transition, determining a second pointer position based on the first pointer position;
    extracting a second data sample based on the second pointer position;
    after detecting the second data transition, detecting an additional location of an additional data transition;
    determining an additional pointer position based on the additional location; and
    extracting an additional data sample based on the additional pointer position.

2. The method of claim 1, wherein the second data transition is the next data transition detected after the first data transition.

3. The method of claim 1, wherein the first data sample is extracted from a first set of data samples, and wherein the second pointer determines which data sample from a second set of data samples is extracted.

4. The method of claim 1, wherein determining the additional pointer position based on the additional location is in response to a jitter event.

5. The method of claim 1, further comprising prior to detecting the additional data transition and subsequent to detecting the second data transition:
    detecting N locations of N data transitions in the oversampled data stream;
    determining at least N pointer positions based on previous pointer positions; and
    extracting at least N data samples based on the at least N pointer positions,
    wherein N is an integer equal to or greater than one,
    wherein zero data transitions are detected after detecting the N locations of N data transitions and before detecting the additional location of the additional data transition.

6. The method of claim 5, wherein determining the additional pointer position comprises adjusting the additional pointer position from an estimated location, wherein the amount of adjustment is limited by a maximum value.

7. The method of claim 6, wherein N and the maximum adjustment amount are programmable integers.

8. The method of claim 7, further comprising:
    changing N or the maximum adjustment amount in response to a change in the oversampling rate or a change in the data rate of the stream from which the oversampled data stream was created.

9. The method of claim 7, further comprising:
    changing N and the maximum adjustment amount such that such that an increase in N corresponds to an increase in the maximum adjustment amount and a decrease in N corresponds to a decrease in the maximum adjustment amount.

10. The method of claim 7, further comprising determining N and the maximum adjustment amount based on at least one measurement of at least one of jitter and noise.

11. The method of claim 10, wherein determining N and the maximum adjustment amount comprises:
    receiving measurements at a plurality of values for N and the maximum adjustment amount; and
    selecting a value for N and the maximum adjustment amount that provide optimal jitter tolerance based on the measurements.

12. The method of claim 10, wherein determining N and the maximum adjustment amount comprises:
    retrieving N and the maximum adjustment amount from a table.

13. The method of claim 1, wherein the second pointer position is determined based on the first pointer position by selecting a position that is a predetermined number of data samples past the first pointer position.

14. An integrated circuit, comprising:
    a receiver that receives an oversampled data stream containing sets of data samples, wherein pointers determine which data samples are to be extracted;
    a transition detector that detects a first location of a first data transition in the oversampled data stream;
    an aligner that aligns a first pointer position based on the first location;
    a positioner adapted to determine a second pointer position after a second data transition is detected, wherein the second pointer position is based on the first pointer position; and
    an extractor that extracts a data sample based on each pointer position,
    wherein the aligner is adapted to align an additional pointer position based on an additional location of an additional data transition detected after the second data transition,
    wherein subsequent to detecting the second data transition and prior to detecting the additional data transition, the detector is operable to detect exactly N locations of N data transitions, and the positioner is adapted to determine at least N pointer positions based on previous pointer positions, wherein N is an integer equal to or greater than zero.

15. The integrated circuit of claim 14, wherein the aligner aligns the additional pointer position in response to a jitter event.

16. The integrated circuit of claim 14, wherein the aligner aligns the additional pointer position by adjusting the additional pointer position from an estimated location, wherein the amount of adjustment is limited by a maximum value.

17. The integrated circuit of claim 16, wherein N and the maximum adjustment amount are programmable integers.

18. The integrated circuit of claim 17, further comprising:
a jitter setting circuit that changes N or the maximum adjustment amount in response to a change in the oversampling rate or a change in the data rate of the stream from which the oversampled data stream was created.

19. The integrated circuit of claim 17, further comprising:
a jitter setting circuit that determines N and the maximum adjustment amount based on at least one measurement of at least one of jitter and noise.

20. The integrated circuit of claim 19, wherein the jitter setting circuit receives measurements at a plurality of values for N and the maximum adjustment amount and selects a value for N and the maximum adjustment amount that provide optimal jitter tolerance based on the measurements.

21. The integrated circuit of claim 20, wherein the jitter setting circuit changes N and the maximum adjustment amount such that an increase in N corresponds to an increase in the maximum adjustment amount and a decrease in N corresponds to a decrease in the maximum adjustment amount.

22. The integrated circuit of claim 19, wherein the jitter setting circuit retrieves N and the maximum adjustment amount from a table.

23. The integrated circuit of claim 14, wherein the positioner determines the second pointer position after a second data transition is detected by selecting a position that is a predetermined number of data samples past the first pointer position.

24. An integrated circuit, comprising:
a receiver that receives an oversampled data stream containing sets of data samples; and
an extractor that uses one or more pointers to determine which data samples of the sets of data samples to extract from the oversampled data stream and adjusts a frequency N of realigning at least one of the one or more pointers relative to a corresponding N+1th detected data transition,
wherein prior to detecting the corresponding N+1th data transition, the extractor extracts data samples of the determined data samples at N pointer positions that are positioned relative to a position of a first one of the one or more pointers, wherein N is an integer equal to or greater than zero, and wherein:
the extractor extracts a first data sample of a first set of the sets of data samples, wherein the first data sample is aligned at a first position relative to a first data transition; and
the extractor extracts a second data sample of a second set of the sets of data samples, wherein the second set of the sets of data samples is separated from the first set of data samples by the second data transition and the second data sample is positioned at a second position that is determined relative to the first position of the first data sample and not relative to the second data transition.

25. The integrated circuit of claim 24, wherein the frequency of pointer adjustment is based on at least one of jitter and noise of the integrated circuit.

26. The integrated circuit of claim 24, wherein the frequency of pointer adjustment is programmable.

27. The integrated circuit of claim 26, wherein an amount of adjustment is programmable.

* * * * *